US011884530B2

(12) United States Patent
Honkawa et al.

(10) Patent No.: US 11,884,530 B2

(45) Date of Patent: Jan. 30, 2024

(54) METHOD AND APPARATUS FOR COMMUNICATING THE STATUS OF A CONSUMABLE

(71) Applicant: Fiji Water Foundation, Los Angeles, CA (US)

(72) Inventors: Bryan Honkawa, Malibu, CA (US); Clarence Chia, Redondo Beach, CA (US)

( * ) Notice: Subject to any disclaimer, the term of this patent is extended or adjusted under 35 U.S.C. 154(b) by 26 days.

(21) Appl. No.: 17/228,651

(22) Filed: Apr. 12, 2021

(65) Prior Publication Data

US 2021/0300746 A1 Sep. 30, 2021

Related U.S. Application Data

(63) Continuation of application No. 15/791,156, filed on Oct. 23, 2017, now Pat. No. 10,974,943.

(60) Provisional application No. 62/420,882, filed on Nov. 11, 2016.

(51) Int. Cl.

| | |
|---|---|
| ***B67D 1/00*** | (2006.01) |
| ***A47G 23/03*** | (2006.01) |
| ***B67D 1/08*** | (2006.01) |
| ***G08B 7/06*** | (2006.01) |

(52) U.S. Cl.

CPC ....... *B67D 1/0004* (2013.01); *A47G 23/0309* (2013.01); *B67D 1/0888* (2013.01); *G08B 7/068* (2013.01)

(58) Field of Classification Search

CPC ................ B67D 1/0004; B67D 1/0888; A47G 23/0309; G08B 7/068

See application file for complete search history.

(56) References Cited

U.S. PATENT DOCUMENTS

| | | | | |
|---|---|---|---|---|
| 2,745,947 A * | 5/1956 | Sansous | A47G 23/0309 | 362/101 |
| 4,858,084 A * | 8/1989 | Sheryll | A47G 23/0309 | 362/802 |
| 5,307,250 A * | 4/1994 | Pearson | A47G 23/0309 | 248/346.11 |
| 6,793,363 B2 * | 9/2004 | Jensen | A47G 23/0309 | 362/101 |
| 7,419,072 B1 * | 9/2008 | Vanella | B65D 23/001 | 222/113 |
| 10,638,864 B2 * | 5/2020 | Abukar | F21V 33/0036 | |
| 10,647,484 B2 * | 5/2020 | Bentkovski | B65D 51/248 | |
| 10,704,782 B2 * | 7/2020 | Lynch | F21V 21/0832 | |
| 10,974,943 B2 * | 4/2021 | Honkawa | G08B 7/068 | |

(Continued)

*Primary Examiner* — John Fitzgerald

*Assistant Examiner* — Tania Courson

(74) *Attorney, Agent, or Firm* — Cotman Ip Law Group

(57) ABSTRACT

An apparatus for communicating the status of a consumable having a tubular housing with a channel, wherein the channel includes a proximal section and a distal section separated by an internal flange, a power module assembly including a coaster coupled on the proximal section of the tubular housing, a top cover, and a bottom cover coupled to the distal section of the tubular housing, a sensor coupled to the coaster for determining a level of beverage in a beverage container, and electronic circuitry for controlling a status indicator, wherein the sensor is in electrical communication with the electronic circuitry, wherein the status indicator is operably coupled to the sensor; and wherein the status indicator is covered by a lampshade.

20 Claims, 11 Drawing Sheets

(56) References Cited

U.S. PATENT DOCUMENTS

| | | | | |
|---|---|---|---|---|
| 2006/0109644 A1* | 5/2006 | Saucier | .............. | A47G 23/0309 362/276 |
| 2010/0147844 A1* | 6/2010 | Connell | ................. | A01G 9/021 220/665 |
| 2010/0157579 A1* | 6/2010 | Kononuk | ........... | A47G 23/0309 362/101 |
| 2013/0259984 A1* | 10/2013 | Eves | .................. | A47G 19/2255 362/101 |
| 2014/0185277 A1* | 7/2014 | Mongeli | ............ | A47G 19/2227 362/382 |
| 2017/0273488 A1* | 9/2017 | Lonis | ..................... | A47G 23/16 |

* cited by examiner

METHOD AND APPARATUS FOR COMMUNICATING THE STATUS OF A CONSUMABLE

CROSS-REFERENCE TO RELATED APPLICATIONS

The present application is a continuation of U.S. patent application Ser. No. 15/791,156, filed Oct. 23, 2017, which claims the benefit of U.S. Provisional Patent Application No. 62/420,882, filed Nov. 11, 2016, each of which is incorporated by reference herein in its entirety.

BACKGROUND OF THE INVENTION

Field of the Invention

Embodiments of the invention relates to visual feedback systems. More specifically, the invention relates to a method and apparatus for communicating the status of a consumable.

Description of the Related Art

Currently, when a restaurant patron orders a bottled water, a glass of water, or any other beverage, a waiter brings the beverage and places it on the table. The patron consumes the beverage and sometimes would have to wait for a long time before a refill. This is primarily because the most prominent way to know that the patron needs a refill is either by the waiter coming to the table and observing that the beverage container is empty or by the patron summoning the waiter and alerting him about needing a refill.

The perceived lack of responsiveness to the patron's needs sometimes lead to frustration and dissatisfaction with a particular establishment.

There are currently no known systems in restaurants of similar environments that provide automatic feedback to waiters of when a patron needs a refill of a beverage, e.g., water.

To overcome the problems and limitations described above there is a need for a method and apparatus for illuminating the status of a consumable.

BRIEF SUMMARY OF THE INVENTION

One or more embodiments of the invention are directed a method and apparatus for communicating the status of a consumable. The invention is a sleeve for providing a visual indication of the status of beverage in a bottle. For instance, in a restaurant environment with one or more sleeves on each table for bottled water, when a customer requests service of water, a bottle is placed in the sleeve on the table thereby enabling the status indicator. In the exemplary embodiment, the status indicator is a light source comprising one or more light emitting diodes (LED). Enabling the light serves multiple purposes, e.g., providing some lighting to the table and also indicating the status of the water in the bottle. Thus, a waiter that passes by the table can easily ascertain whether or not the customer needs a replacement bottle by the status of the light. The sleeve can be configured for use with a can, cup, etc.

In one or more embodiments, the sleeve comprises a tubular housing with a channel. The channel is divided into a proximal or top section and a distal or bottom section. The bottom and top sections are separated by an internal flange.

In one or more embodiments, the sleeve further comprises a power module assembly coupled in the channel of the tubular housing. The power module assembly comprises a coaster coupled on the proximal side of the internal flange, a top cover and a bottom cover coupled to the distal side of the internal flange. The top cover is housed in a chamber above the bottom cover.

The sleeve further comprises a sensor coupled to the top cover for determining the level of beverage in a beverage container. In one or more embodiments, the sensor is a spring-loaded switch on the coaster that is configured to trigger and enable the status indicator based on a predetermined weight of the beverage container.

The sleeve further comprises a status indicator coupled to the sensor. In one or more embodiments, the status indicator is one or more LED light source on the coaster.

In other embodiments of the present invention, the apparatus comprises a coaster for a beverage container. A power module assembly with a top cover and a bottom cover that is coupled to the coaster. A sensor is coupled to the coaster for determining the status of beverage in a beverage container. The sensor is in electrical communication with the top cover. The apparatus further includes a status indicator coupled to the sensor.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

Figure 1:
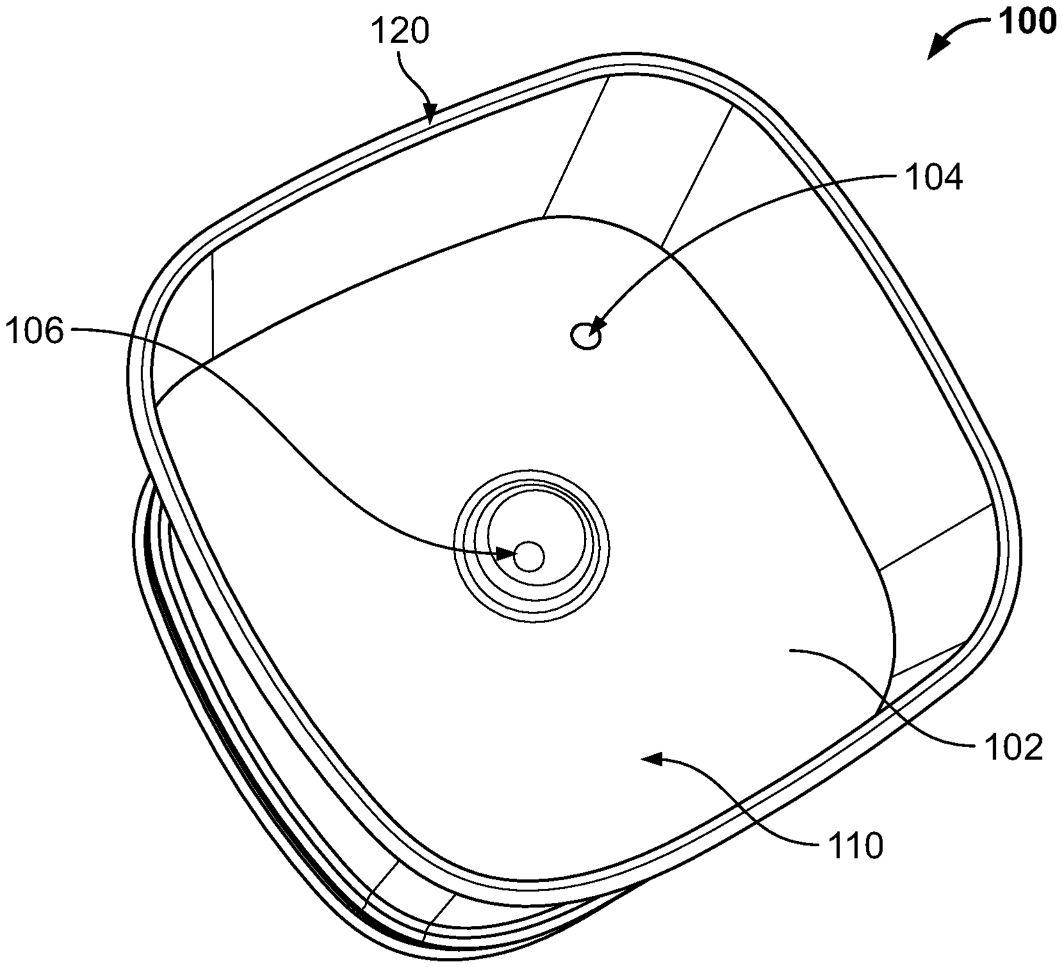
FIG. 1 is a top perspective view of a sleeve for holding a bottle in accordance with one or more embodiments of the present invention.

The present invention comprising a method and apparatus for communicating the status of a consumable will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. It should be noted that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term “first”, “second” and the like, herein do not denote any order, quantity or importance, but rather are used to distinguish one element from another, and the terms “a” and “an” herein do not denote a limitation of quantity, but rather denote the presence of at least one of the referenced item.

Spatially relative terms, such as “beneath,” “below,” “lower,” “under,” “above,” “upper,” and the like, may be used herein for ease of explanation to describe one element or feature’s relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as “below” or “beneath” or “under” other elements or features would then be oriented “above” the other elements or features. Thus, the example terms “below” and “under” can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being “on,” “connected to,” or “coupled to” another element or layer, it can be directly on, connected to, or coupled to the other element or layer, or one or more intervening elements or layers may be present. In addition, it will also be understood that when an element or layer is referred to as being “between” two elements or layers, it can be the only element or layer between the two elements or layers, or one or more intervening elements or layers may also be present.

As used herein, the term “substantially,” “about,” and similar terms are used as terms of approximation and not as terms of degree, and are intended to account for the inherent deviations in measured or calculated values that would be recognized by those of ordinary skill in the art. Further, the use of “may” when describing embodiments of the present invention refers to “one or more embodiments of the present invention.” As used herein, the terms “use,” “using,” and “used” may be considered synonymous with the terms “utilize,” “utilizing,” and “utilized,” respectively. Also, the term “exemplary” is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein. For the purposes of this application, the term channel may be interchanged with lumen or lumen cavity. For the purposes of this application, the term top cover may be interchanged with electronic module container or electronic module. For the purposes of this application, the term bottom cover may be interchanged with power supply module. For the purposes of this application, the term power module may be interchanged with power module assembly.

One or more embodiments of the present invention will now be described with references to FIGS. 1-11.

FIG. 1 is a top perspective view of sleeve 100 for holding a bottle in accordance with one or more embodiments of the present invention. As illustrated, sleeve 100 comprises body (or housing) 120; power module assembly 110 coupled to and housed inside body 100; a switch 104; and a status indicator 106.

Figure 2A:
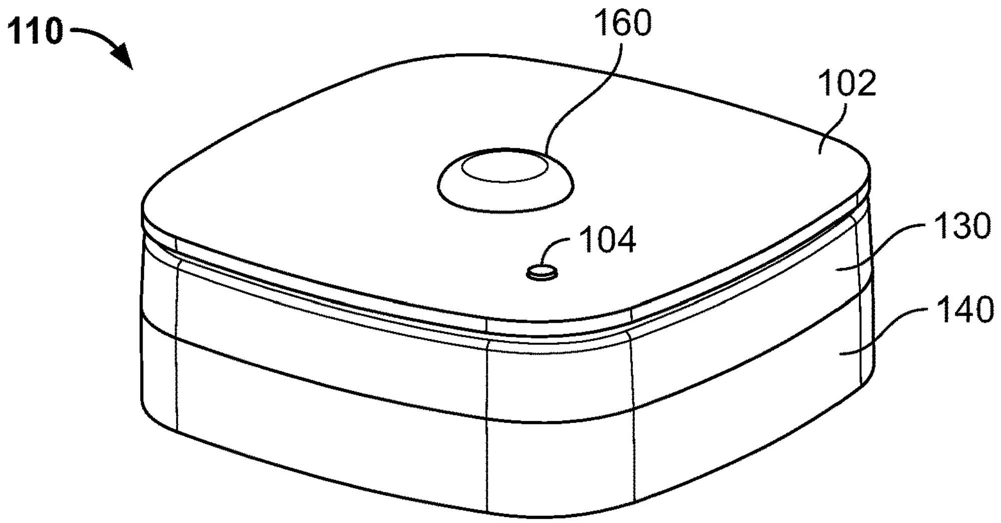
FIG. 2A is an isometric view of the power module assembly of the sleeve in accordance with one or more embodiments of the present invention.
Figure 2B:
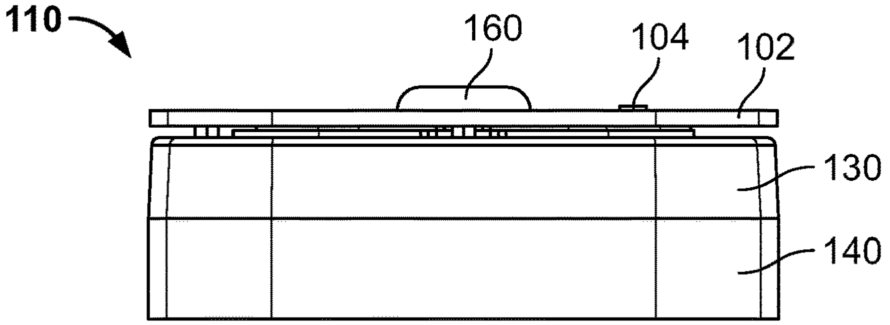
FIG. 2B is side elevational view of the power module assembly of the sleeve in accordance with one or more embodiments of the present invention.
Figure 2C:
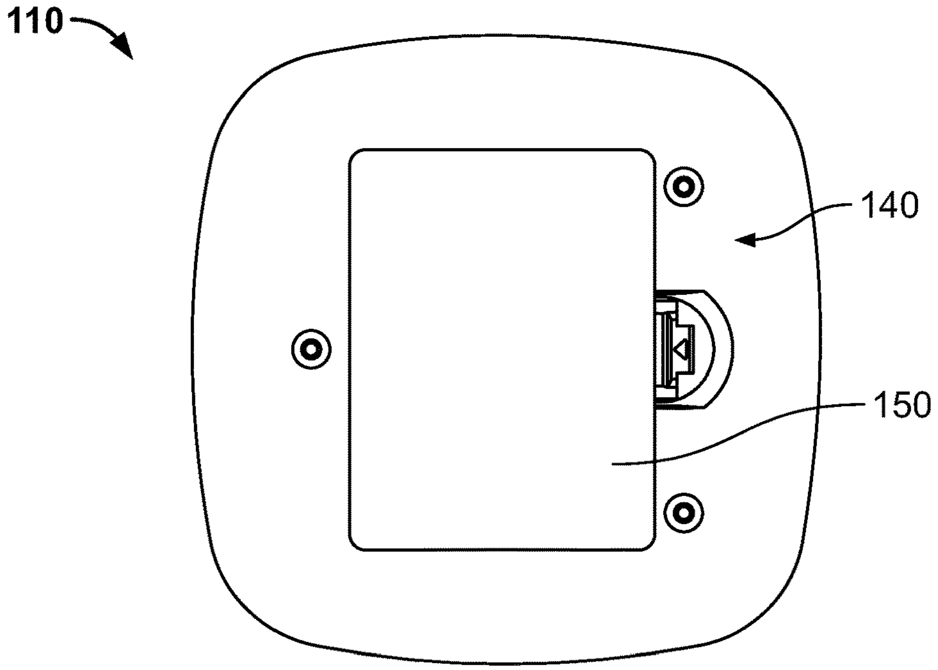
FIG. 2C is bottom plan view of the power module assembly of the sleeve in accordance with one or more embodiments of the present invention.

FIGS. 2A-2C are different views of the power module assembly 110 of the sleeve in accordance with one or more embodiments of the present invention. As illustrated, power module assembly 110 comprises beverage coaster 102; electronic module container or top cover 130; bottom cover or power supply module 140; battery compartment cover 150; switch 104; and status indicator 106.

Figure 3:
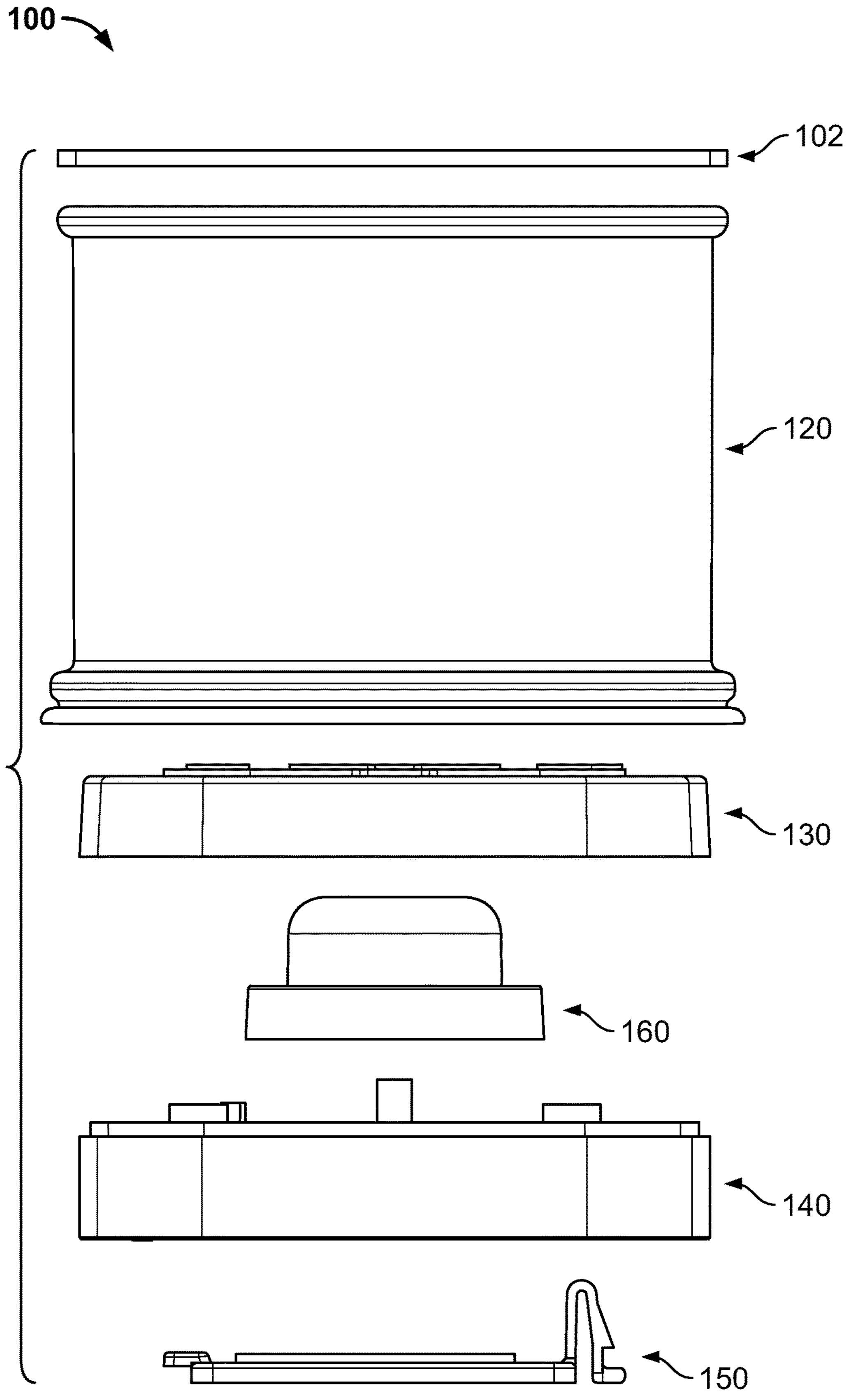
FIG. 3 is an exploded view of the sleeve in accordance with one or more embodiments of the present invention.

FIG. 3 is an exploded view of the sleeve 100 to show relationship of the components in accordance with one or more embodiments of the present invention. As illustrated coaster 102 is coupled to the remainder of the power module assembly 110 through inward projecting flange 122 at the proximal end 128 (i.e., top section) of the housing 120 (see FIG. 4). Internal flange 122 includes one or more guiding holes 126 for corresponding guideposts 116 (see FIG. 8B). Each guidepost 116 on the backside of beverage coaster 102 is configured to fit into a corresponding guiding hole 126 on flange 122.

The remaining elements of the power module assembly 110 are coupled to the distal end 124 (i.e., bottom section) of the housing 120. As illustrated in FIG. 3, the relationship of the elements is such that the battery compartment cover 150 is coupled to the bottom side of the bottom cover 140; lampshade 160 is located between bottom cover 140 and top cover 130; and top cover 130 resides on the distal side of flange 122 and inside the housing 120 at section 124.

Figure 4A:
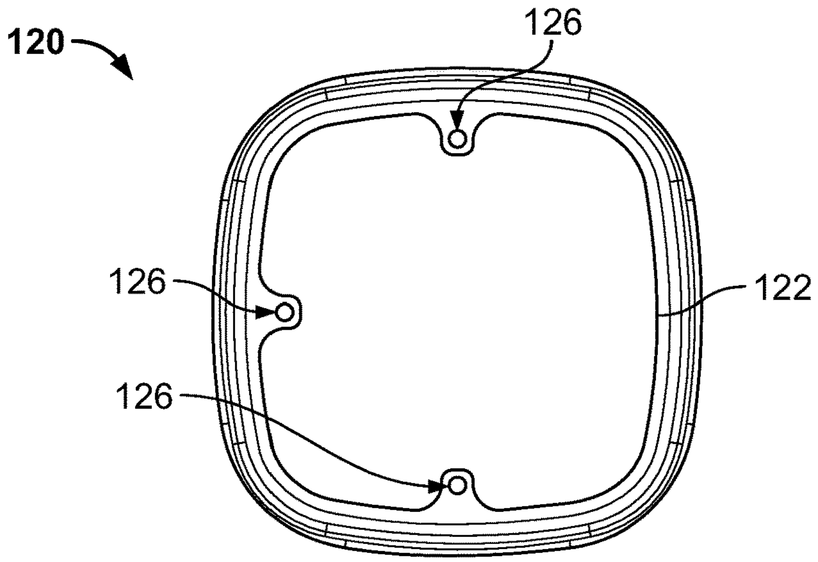
FIG. 4A is top plan view of the housing of the sleeve in accordance with one or more embodiments of the present invention.
Figure 4B:
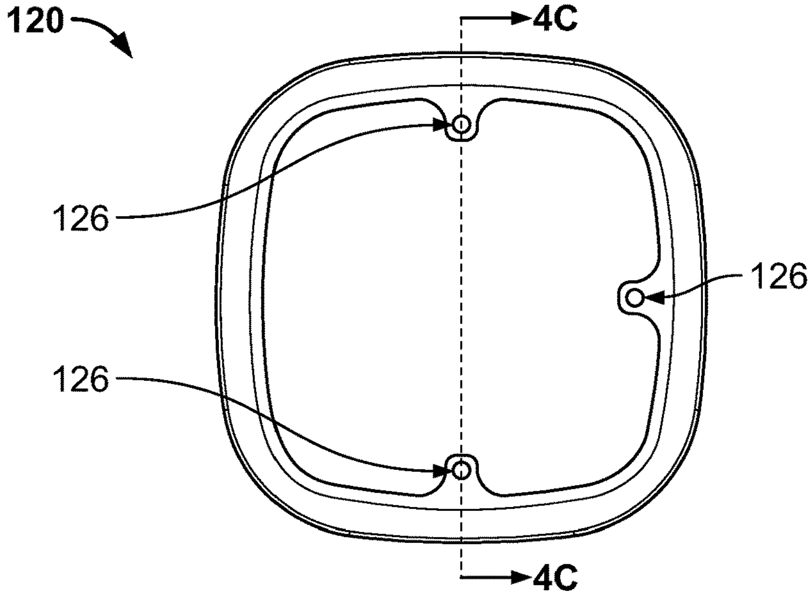
FIG. 4B is bottom plan view of the housing of the sleeve in accordance with one or more embodiments of the present invention.
Figure 4C:
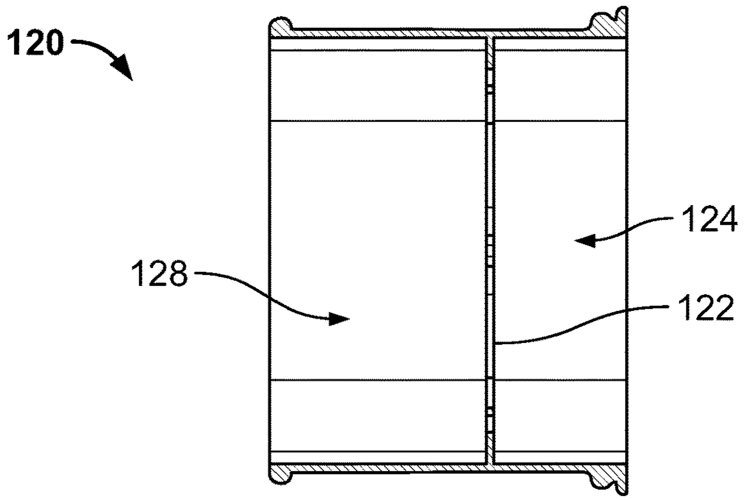
FIG. 4C is cross-sectional view of section A-A of the housing of the sleeve in accordance with one or more embodiments of the present invention.

FIGS. 4A-C are different views of the housing 120 in accordance with one or more embodiments of the present invention. As illustrated, housing 120 is a tubular member with a channel comprising a top section 128 and a bottom section 124 separated by an inward projecting flange (or shelf) 122. Flange 122 includes one or more guiding holes 126. Preferably, flange 122 includes two or more guiding holes to minimize any rotational movement of the beverage coaster inside the housing. Specifically, in the illustrated embodiment, flange 122 includes three guiding holes on three sides of the substantially four sided housing. Preferably, the internal shape of housing 120 will depend on the shape of beverage bottle 10 (see FIG. 11). For instance, the shape of housing 120 could be cylindrical, square (with or without rounded edges), rectangular (with or without rounded edges), or any other desirable shape that can hold a beverage container. However, those of skill in the art would appreciate that the internal shape of housing 120 does not have to be configured for a specific beverage container and that shapes that can accommodate different type and size containers are contemplated.

Figure 5A:
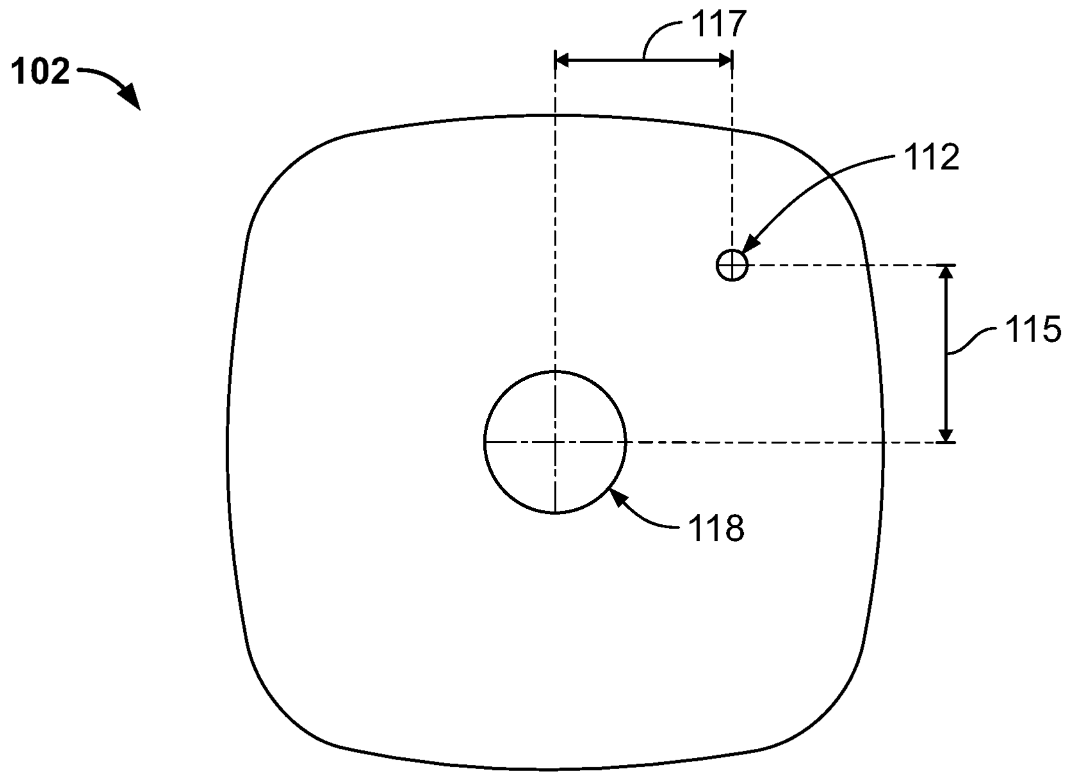
FIG. 5A is top plan view of beverage coaster of the power module assembly in accordance with one or more embodiments of the present invention.
Figure 5B:
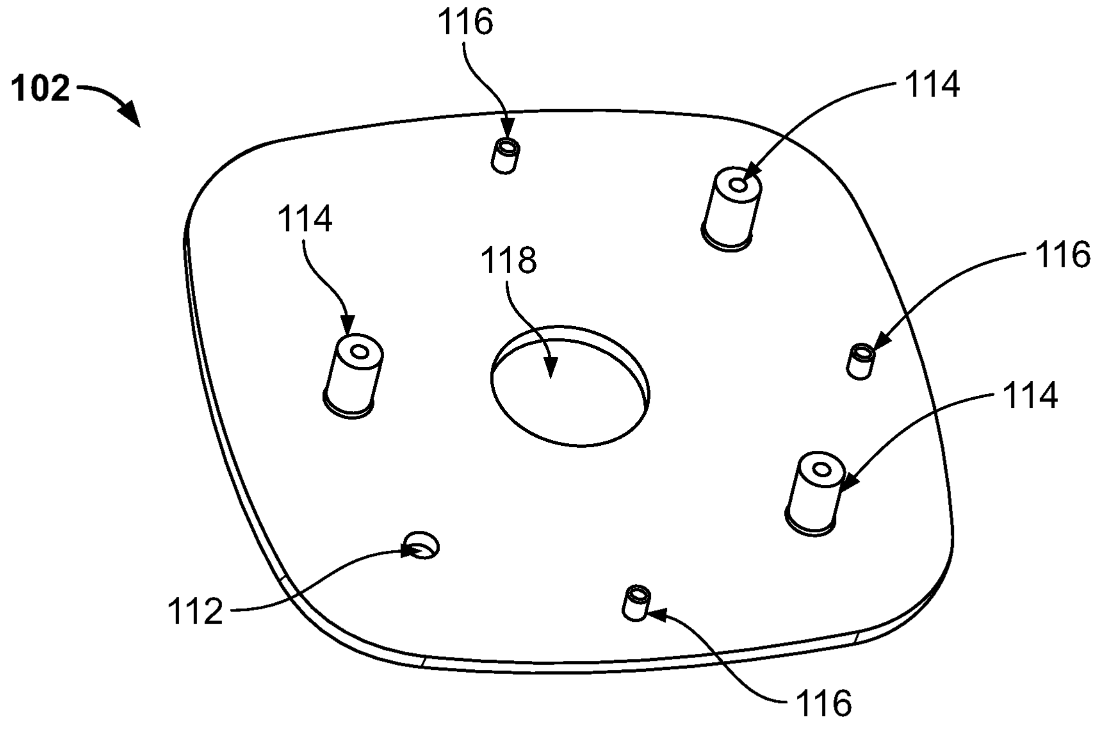
FIG. 5B is bottom perspective view of beverage coaster of the power module assembly in accordance with one or more embodiments of the present invention.

FIGS. 5A-B are different views of beverage coaster 102 of the power module assembly in accordance with one or more embodiments of the present invention. As illustrated, beverage coaster 102 includes a hole 112 for switch 104 and hole 118 for status indicator 106. Switch 104 is preferably spring-loaded such that it is enabled upon compression by the weight of an object placed on it. In one or more embodiments, spring-loaded switch 104 and status indicator 106 are coupled to electronic circuitry, e.g., circuit board (not shown), in top cover 130. The function of switch 104 is to activate the status indicator 106 when a beverage bottle of a predetermined threshold weight is placed on the coaster 102. Thus, as the beverage in the bottle 10 is consumed, the weight of the bottle and its content decreases and eventually falls below the predetermined threshold weight thereby disengaging the switch. Those of skill in the art would appreciate that other types of switches are contemplated. For example, a sensor on the sidewalls that senses beverage level in the bottle could be used instead of a spring-loaded switch on the coaster, optical switches, etc.

In one or more embodiments, switch 104 is located such that its X and Y distances from the center of the coaster (i.e., 115 and 117) is such that the switch can be optimally activated by the bottom wall of the beverage bottle 10.

In one or more embodiments, the status indicator 106 is an LED light source which includes lampshade 160. An LED lamp (not shown), which is covered by the lampshade 160, lights up when a beverage bottle 10 with sufficient liquid is placed inside the sleeve, i.e., on top of the coaster 102, to visually indicate that the bottle is not empty. Those of skill in the art would appreciate that the status indicator 106 could also be on the outside of the sleeve. In a preferred embodiment, the LED lamp is off when there is no beverage bottle in the sleeve or when the level of the beverage in the bottle causes the weight of bottle and beverage combination to fall below the predetermined threshold value.

In other embodiments of the invention, status indicator 106 could comprise a wireless radio, e.g., Bluetooth, that transmits the status of each sleeve 100 to a mobile device or similar device, e.g., smartphone, computer, tablet, etc. (i.e., smart device). In such embodiment, the status indicator is a signal configured to be wirelessly communicated to a smart device, for example.

Figure 8A:
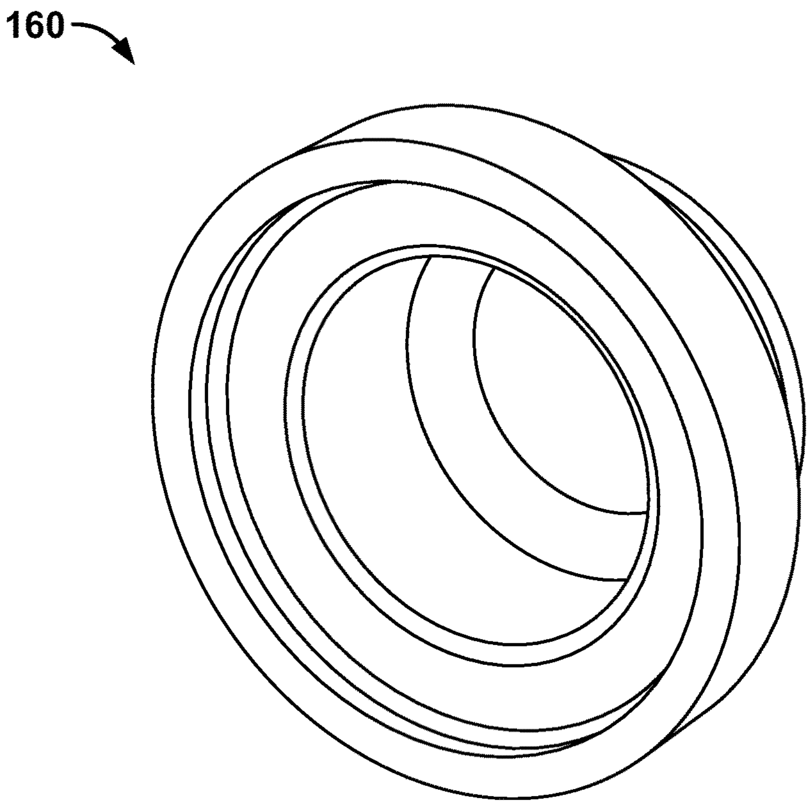
FIG. 8A is bottom isometric view of the lampshade of the power module assembly in accordance with one or more embodiments of the present invention.
Figure 8B:
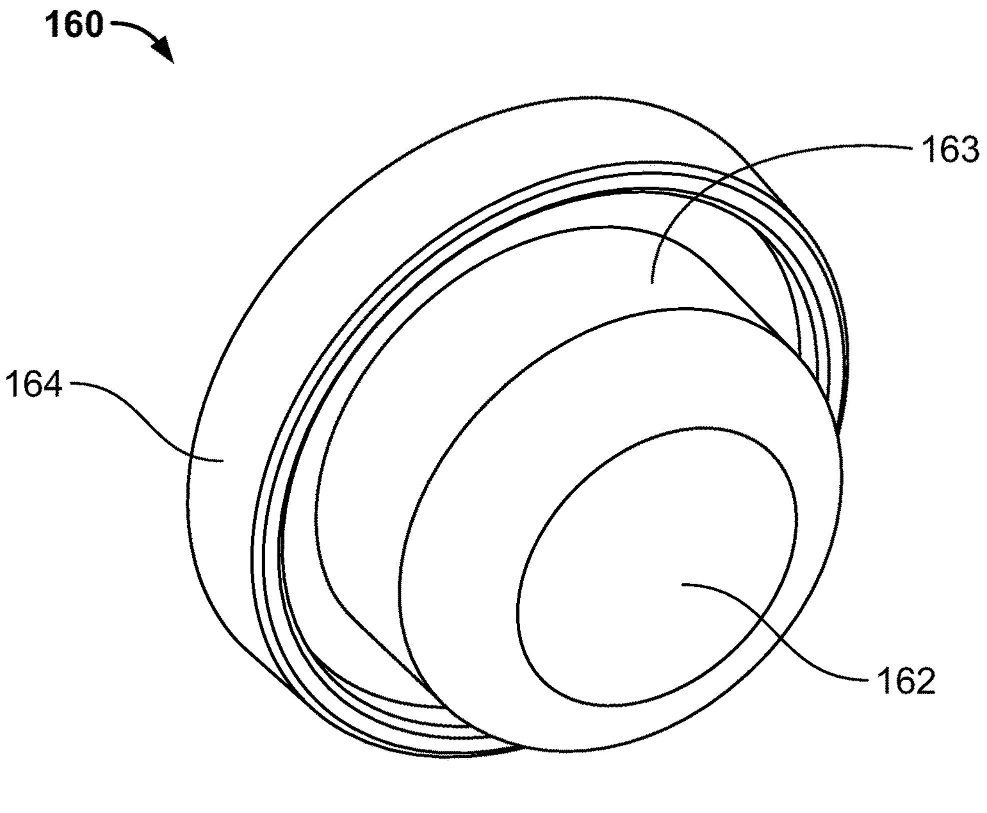
FIG. 8B is top isometric view of the lampshade of the power module assembly in accordance with one or more embodiments of the present invention.

FIGS. 8A-B are different views of the lampshade 160 of the power module assembly in accordance with one or more embodiments of the present invention. As illustrated, the lampshade comprises a top wall 162 with a downward flowing sidewall 163 which terminates into an outward flange 164. When installed in the top cover 130, the flange 164 is on the bottom side of top cover 130 while top wall 162 fits through hole 138 of top cover 130 and is exposed on the topside of top cover 130 and also fits through hole 118 of coaster 102. Hole 138 in top cover 130 and hole 118 in coaster 102 are sized to fit the outside perimeter of the sidewall 163 of the lampshade.

Returning back to FIG. 8B, the bottom side of the coaster 102 comprises one or more guideposts 116. Each of the one or more guideposts 116 sized to fit into a corresponding one of guide hole 126 on flange 122 of housing 120. The bottom side of the coaster 102 further comprises one or more coupling posts 114. Each coupling post 114 includes a threaded hole for securing the top cover 130 and bottom cover 140 to the coaster 102.

Figure 6A:
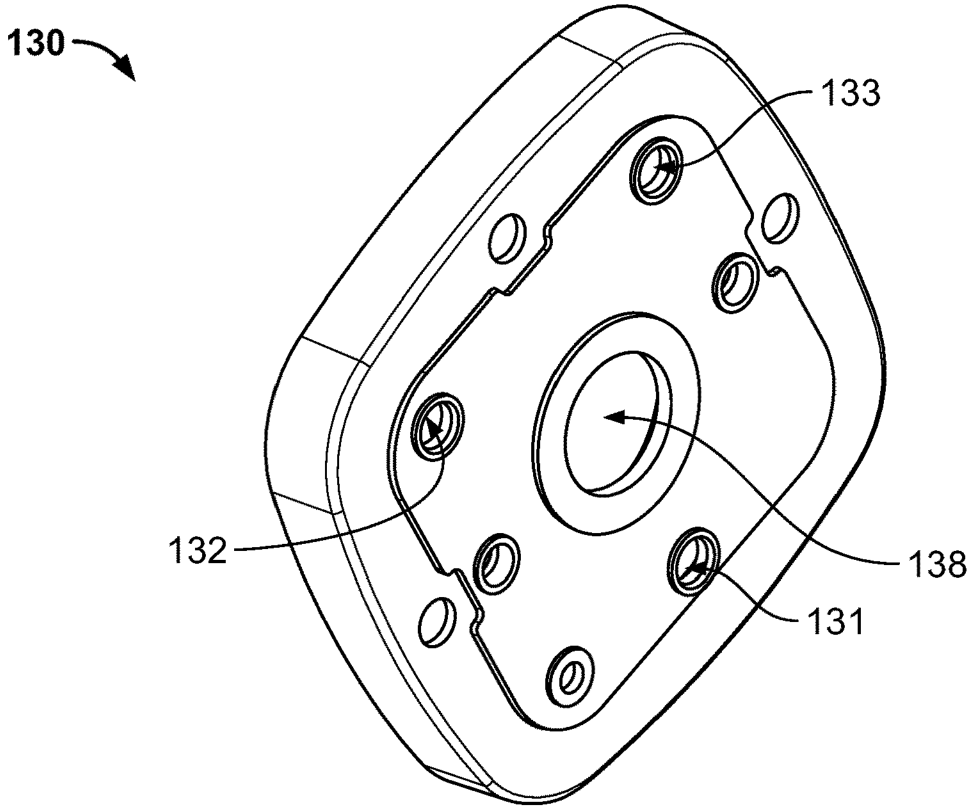
FIG. 6A is top isometric view of the top cover of the power module assembly in accordance with one or more embodiments of the present invention.
Figure 6B:
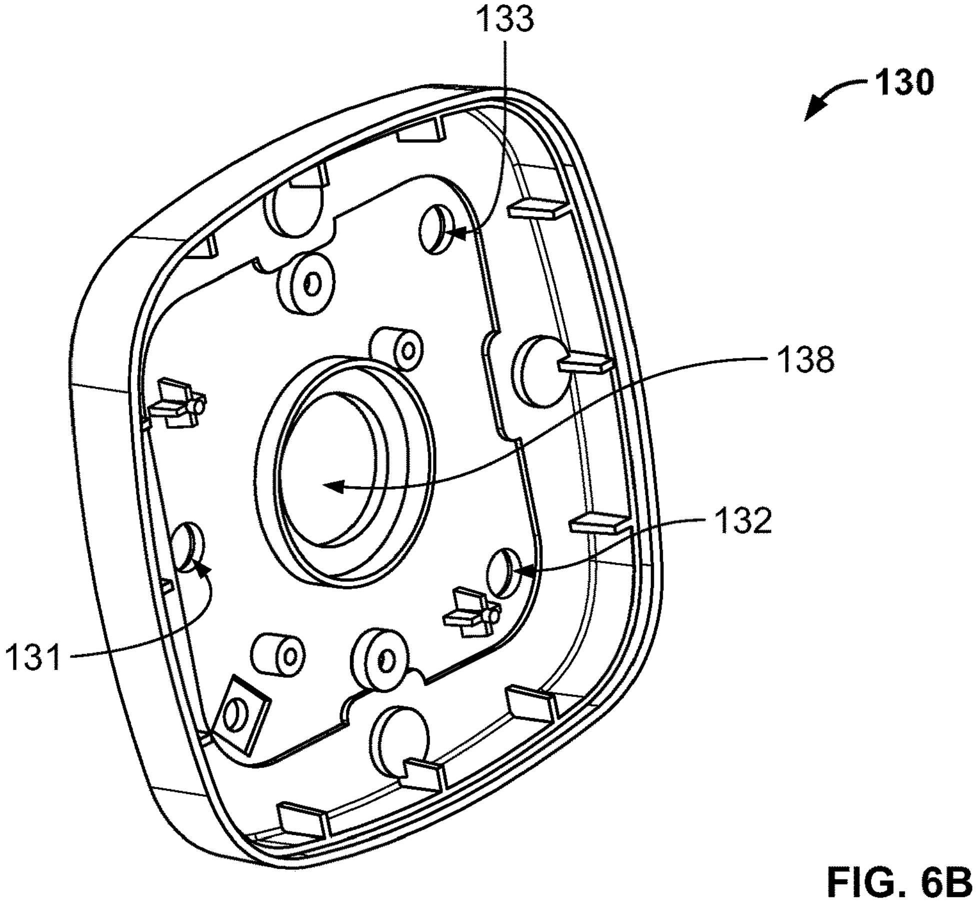
FIG. 6B is bottom isometric view of the top cover of the power module assembly in accordance with one or more embodiments of the present invention.

FIGS. 6A-B are different views of the top cover (or electronic module) 130 of the power module assembly 110 in accordance with one or more embodiments of the present invention. The top cover 130 is configured to house the electronic components for control of the status indicator 106, e.g., a circuit board. The electronic components may include a microcontroller, for instance. The switch 104 and status indicator 106 are coupled to electronic components housed in the top cover 130. The top cover further includes one or more holes 131-133. Each hole, e.g., 131-133, acts as a pass-through for a bolt for coupling the bottom cover 140 to a corresponding threaded hole in post 114 of coaster 102 thereby coupling together the entire power module assembly 110.

Figure 7A:
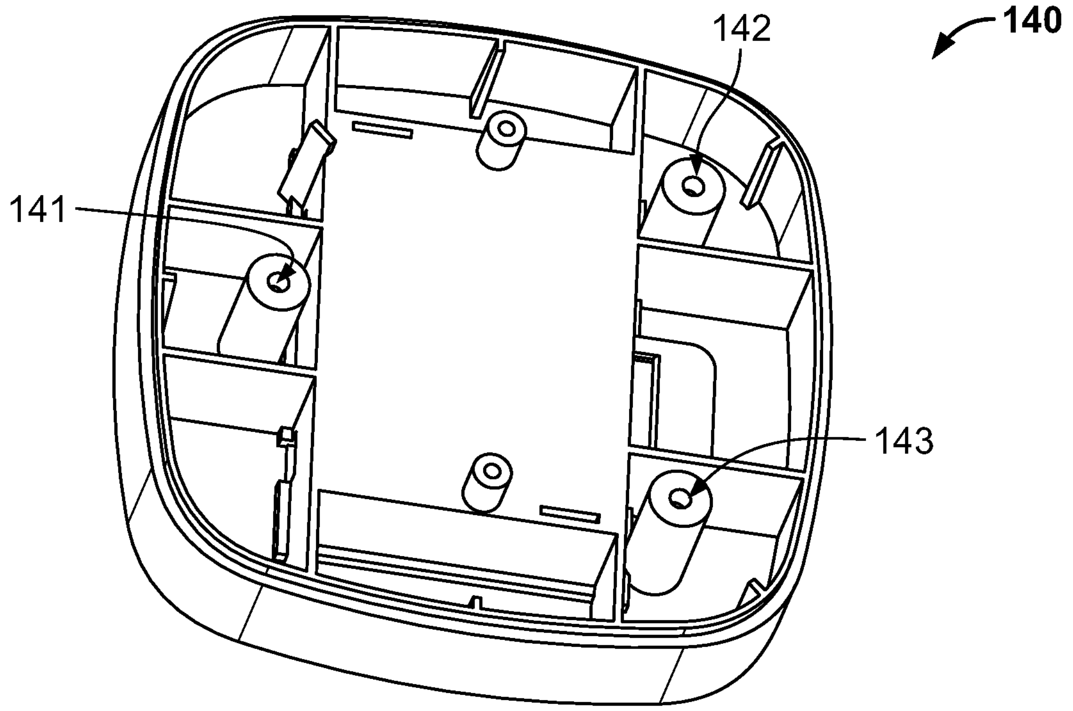
FIG. 7A is top isometric view of the bottom cover of the power module assembly in accordance with one or more embodiments of the present invention.
Figure 7B:
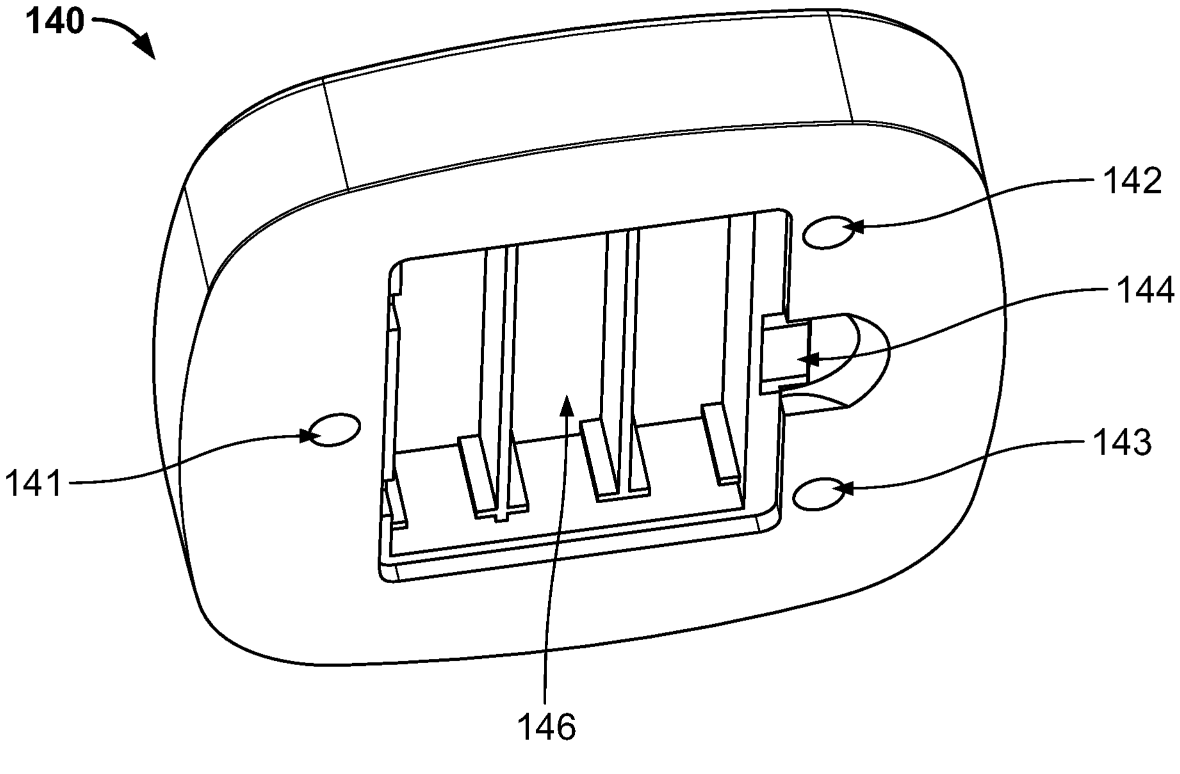
FIG. 7B is bottom isometric view of the bottom cover of the power module assembly in accordance with one or more embodiments of the present invention.

FIGS. 7A-B are different views of the bottom cover (or power supply module) 140 of the power module assembly 110 in accordance with one or more embodiments of the present invention. As illustrated, the bottom cover may be configured to house one or more batteries and/or power regulators (e.g., transformers) for the electronic components in battery compartment 146. Those of skill in the art would appreciate that various types of power sources could be employed. For instance, the power supply could be from one or more batteries, an electrical power outlet, etc. Rechargeable batteries could also be used with an external power connector in the power module assembly 110 for recharging the batteries.

In one or more embodiments, the bottom cover 140 further includes one or more through holes, e.g., 141-143, that run its entire height. Each hole, e.g., 141-143, is configured to accept a bolt for coupling the bottom cover 140 to a corresponding threaded hole in post 114 of coaster 102 thereby holding together the entire power supply assembly 110.

Figure 9A:
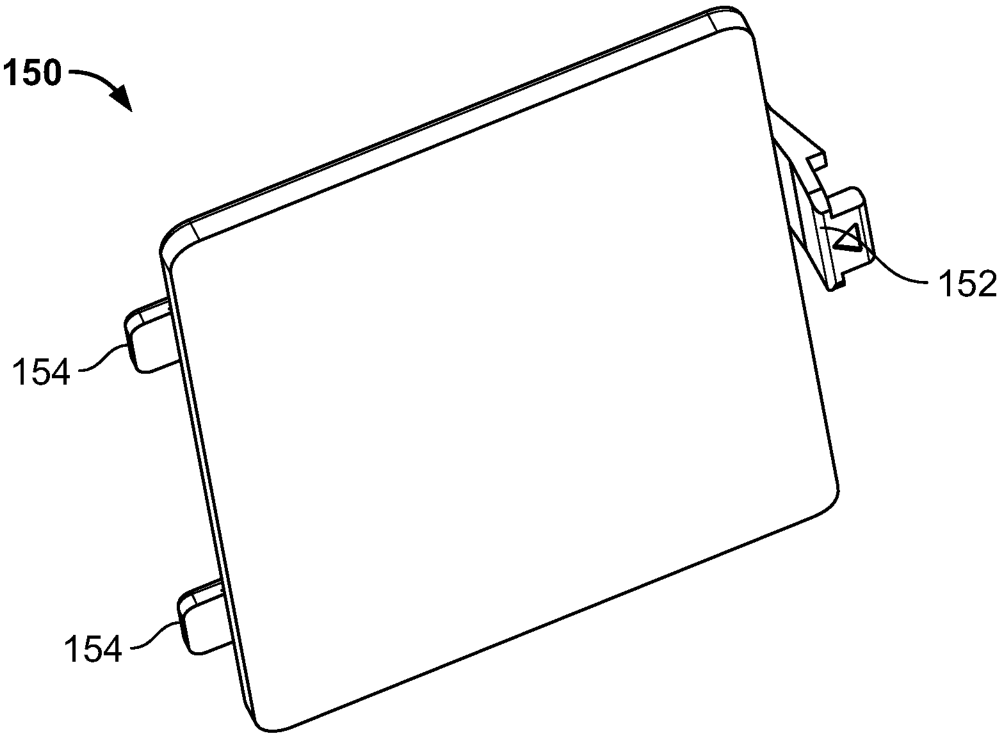
FIG. 9A is bottom isometric view of the battery cover of the battery compartment in accordance with one or more embodiments of the present invention.
Figure 9B:
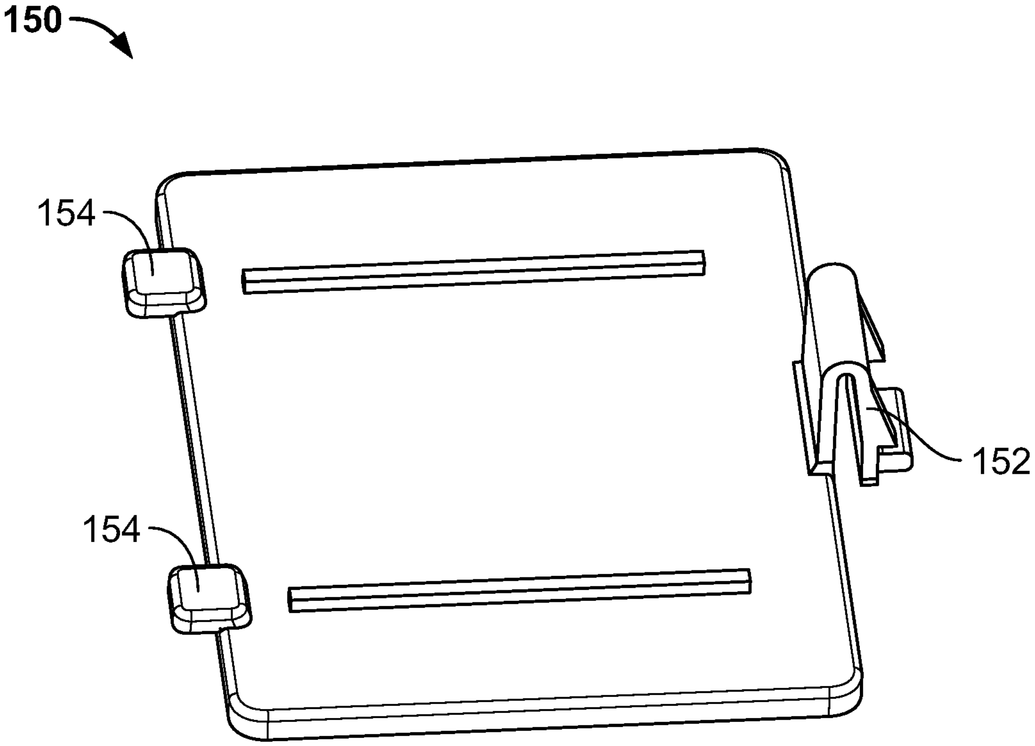
FIG. 9B is top isometric view of the battery cover of the battery compartment in accordance with one or more embodiments of the present invention.

Battery cover 150 secures the one or more batteries in the battery compartment 146. FIGS. 9A-B are different views of the battery compartment cover 150 in accordance with one or more embodiments of the present invention. The battery compartment cover 150 includes one or more flaps, e.g., 154, at one end that fit into the distal end of the battery compartment and a latch 152 at the opposing end that engages with a latch hole 144 at the proximal end of the battery compartment 146.

Figure 10:
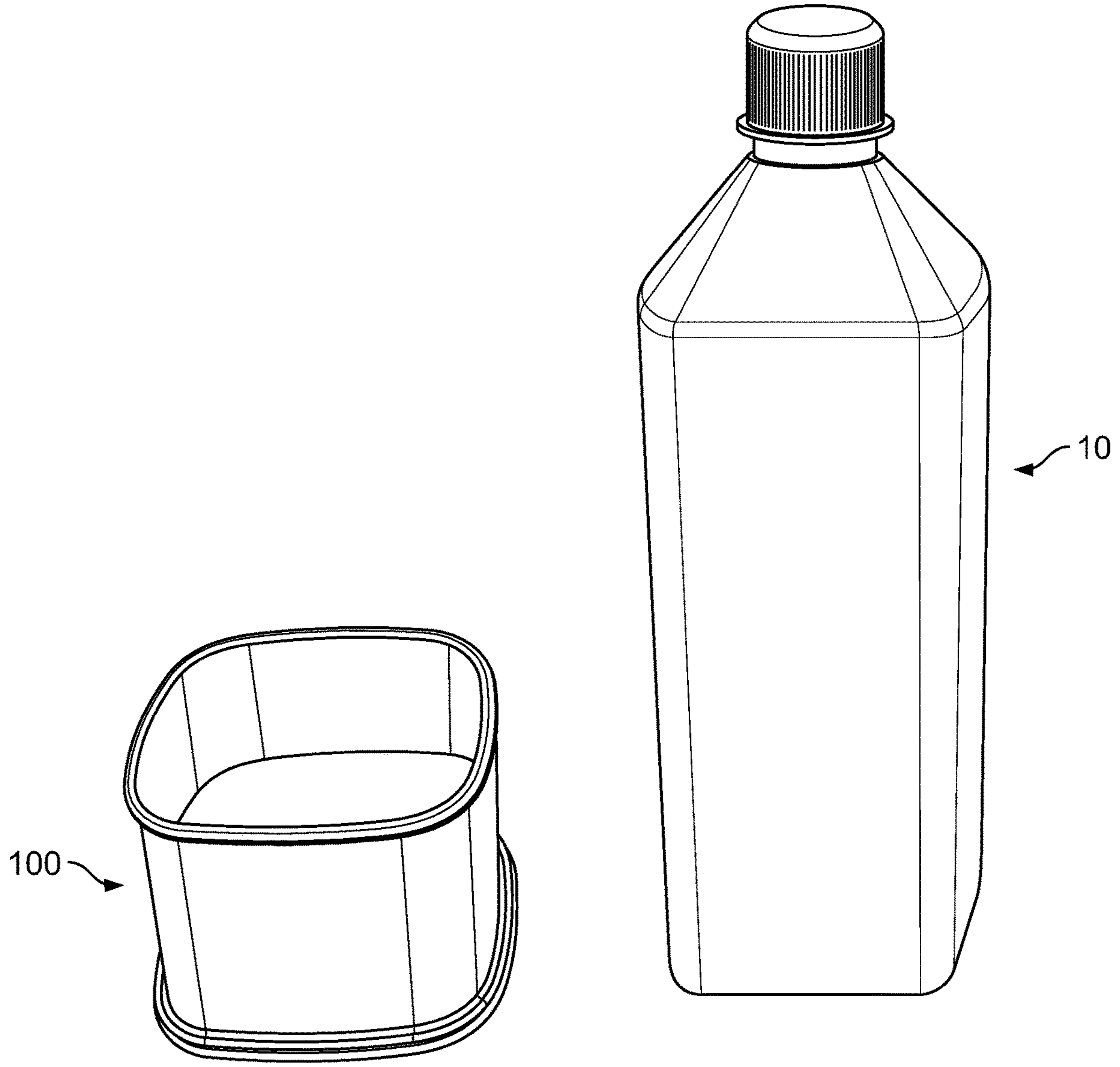
FIG. 10 is an illustration showing the sleeve and a corresponding water bottle side by side in accordance with one or more embodiments of the present invention.
Figure 11:
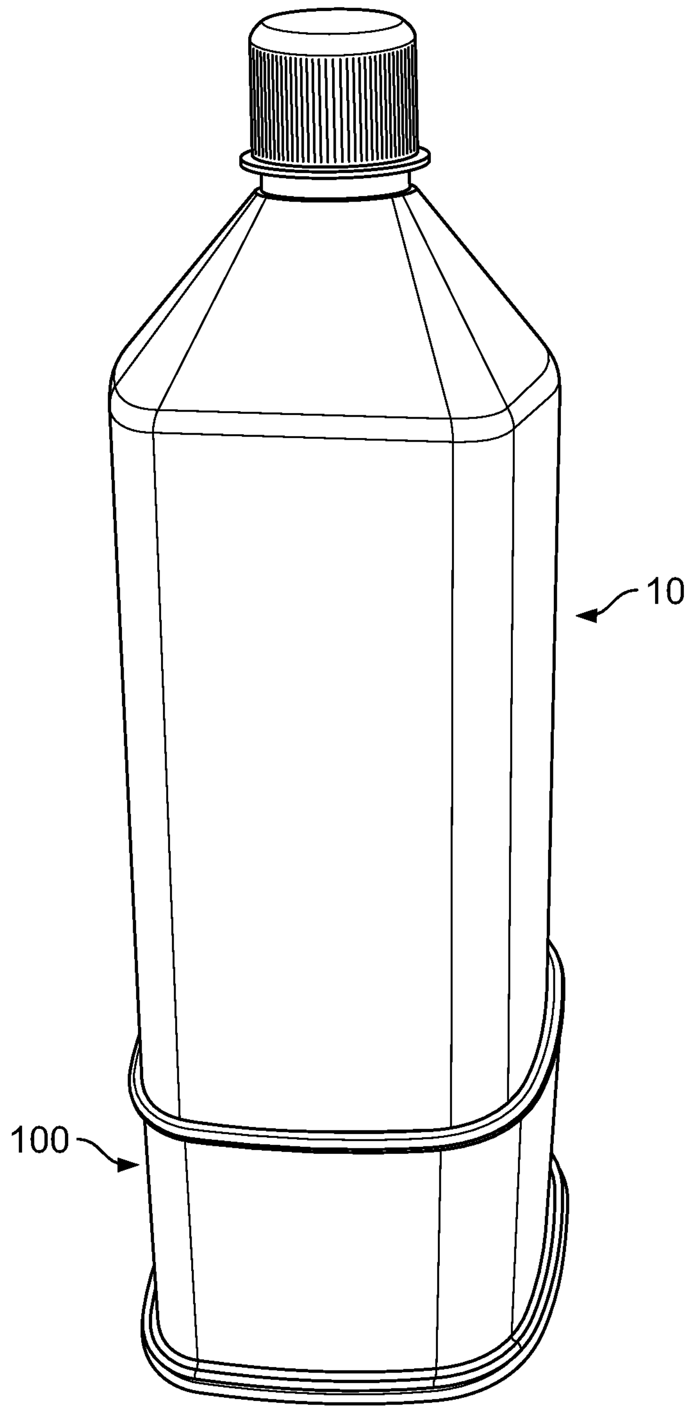
FIG. 11 is an illustration showing the water bottle inside the sleeve in accordance with one or more embodiments of the present invention.

FIG. 10 is an illustration of the sleeve 100 before a corresponding water bottle 10 is placed inside the sleeve. FIG. 11 is an illustration of the water bottle 10 inside the sleeve 100. One purpose of the invention is to provide a visual indication of the status of the beverage in the bottle. For instance, assuming a restaurant environment with one or more sleeves on each table for bottled water. When the customer requests service of water, a bottle is placed in a sleeve on the table thereby enabling the status indicator 106. In the exemplary embodiment where the status indicator is a light source, enabling the light serves multiple purposes, e.g., providing some lighting to the table and also indicating the status of the water in the bottle. Thus, a waiter that passes by the table can easily ascertain whether or not the customer needs a replacement bottle by the status of the light. Of course, the sleeve is not limited to use with a bottle. For instance, it could be used with cans, drinking glasses, etc.

In one or more embodiments of the present invention, the apparatus comprises a coaster 102 for a beverage container. The coaster may optionally be coupled to a housing such as sleeve 120, or a shell body of any other shape. The coaster 102 may be inside the housing or on top of the housing. A sensor is coupled to the coaster for sensing and providing the status of beverage in a beverage container placed on top of the coaster. A power module assembly is coupled to the housing. In one or more embodiments, the power module assembly comprises a top cover and a bottom cover. The top cover may include a microcontroller, for example.

In one or more embodiments, the bottom cover may comprise one or more batteries. The battery may be rechargeable, for instance.

In one or more embodiments, the sensor is in electrical communication with the top cover is coupled to a status indicator. The status indicator could be a light, or a signal wirelessly communicated to a waiter, for example. The status indicated may be activated when the beverage level or quantity in the beverage container is below a predetermined level, for instance. The sensor may be configured to measure the weight of the beverage and container combination or be configured to read the level of beverage in the container. Those of skill in the art would appreciate that there are various ways of determining whether or not a beverage container is empty.

In other embodiments, the status indicator may be configured in the reverse from that discussed above. For instance, instead indicating when the beverage container is about empty, it could indicate when the beverage container is about full. For instance, a green light may be illuminated when the container is not empty and a red light when the container is about empty. An intermediate color may also be added, e.g., yellow, when the container is approaching empty. In such an embodiment, the color scheme may be managed with a microcontroller controlling one or more light emitting diodes with different color spectrums to provide controllability for the color of emitted light.

While the invention herein disclosed has been described by means of specific embodiments and applications thereof, numerous modifications and variations could be made thereto by those skilled in the art without departing from the scope of the invention set forth in the claims.

What is claimed is:

1. An apparatus for communicating a status of a consumable comprising:

a tubular housing with a channel, wherein the channel comprises a proximal section and a distal section separated by an internal flange, wherein the internal flange includes at least one guiding hole;

at least one guidepost, wherein each guidepost is configured to fit into at least one guiding hole;

a power module assembly comprising:

a coaster coupled on the proximal section of the tubular housing, wherein at least one guidepost is located on back of the coaster, a top cover, and a bottom cover, wherein the bottom cover is below the internal flange;

a sensor coupled to the coaster for determining a level of beverage in a beverage container; and electronic circuitry for controlling a status indicator, wherein the sensor is in electrical communication with the electronic circuitry; wherein the status indicator is operably coupled to the sensor; and wherein the status indicator is covered by a lampshade, wherein the lampshade is located between bottom cover and top cover.

2. The apparatus of claim 1, wherein the sensor is a spring-loaded switch on the coaster that is configured to trigger and enable the status indicator based on a predetermined weight of the beverage container.

3. The apparatus of claim 1, wherein the status indicator is light emitting diode light source on the coaster.

4. The apparatus of claim 1, wherein the electronic circuitry is housed in a chamber that is coupled to the bottom cover.

5. The apparatus of claim 1, wherein the bottom cover comprises one or more batteries, wherein the bottom cover is coupled to the distal section of the tubular housing.

6. The apparatus of claim 1, wherein the status indicator is a signal configured to be wirelessly communicated to a smart device.

7. A method of communicating a status of a consumable from an apparatus including a tubular housing with a channel, wherein the channel comprises a proximal section and a distal section separated by an internal flange, a power module assembly comprising a coaster coupled on the proximal section of the tubular housing, a top cover, and a bottom cover, wherein the bottom cover is below the internal flange, wherein the internal flange includes at least one guiding hole, at least one guidepost, wherein each guidepost is configured to fit into at least one guiding hole, wherein the bottom cover includes at least one through hole, wherein the through hole is configured to accept a bolt for coupling the bottom cover, wherein the through hole is configured to hold the power module assembly together; a sensor coupled to the coaster for determining a level of beverage in a beverage container, and electronic circuitry for controlling a status indicator, wherein the status indicator is controlled, comprising the steps of:

adjusting a light source;

supplying power, by a battery; and controlling, by the electronic circuitry operably in electrical communication with the status indicator, wherein the status indicator is operably coupled to the sensor.

8. The apparatus of claim 7, wherein the sensor is a spring-loaded switch on the coaster that is configured to trigger and enable the status indicator based on a predetermined weight of the beverage container.

9. The apparatus of claim 7, wherein the status indicator is light emitting diode light source on the coaster.

10. The apparatus of claim 7, wherein the electronic circuitry is housed in a chamber that is coupled to the bottom cover.

11. The apparatus of claim 7, wherein the bottom cover comprises one or more batteries.

12. The apparatus of claim 7, wherein the status indicator is a signal configured to be wirelessly communicated to a smart device.

13. The apparatus of claim 7, wherein the status indicator is covered by a lampshade.

14. An apparatus for communicating a status of a consumable comprising: a coaster for a beverage container;

a tubular housing with a channel, wherein the channel comprises a proximal section and a distal section separated by an internal flange, wherein the internal flange includes at least one guiding hole;

at least one guidepost, wherein at least one guidepost is configured to fit into a corresponding guiding hole on the internal flange, wherein at least one guidepost is located on a backside of the coaster;

a power module assembly coupled to the coaster, wherein the power module assembly comprises:

a top cover, and a bottom cover, wherein the bottom cover is below the internal flange, wherein the bottom cover includes at least one through hole, wherein the through hole is configured to accept a bolt for coupling the bottom cover, wherein the through hole is configured to hold the power module assembly together;

a sensor coupled to the coaster for determining a status of beverage in the beverage container, wherein the sensor is in electrical communication with electronic circuitry;

wherein a status indicator is operably coupled to the sensor, wherein the status indicator is located between the bottom cover and top cover.

15. The apparatus of claim 14, wherein the status indicator is one or more light emitting diodes.

16. The apparatus of claim 14, wherein the status indicator is signal configured to be wirelessly communicated to a smart device.

17. The apparatus of claim 14, wherein the coaster is coupled to a housing.

18. The apparatus of claim 14, wherein the status indicator is covered by a lampshade.

19. The apparatus of claim 14, wherein the status of beverage is when the beverage container is below a predetermined level.

20. The apparatus of claim 19, wherein the predetermined level is when the beverage container is about empty.

* * * * *